UNITED STATES PATENT OFFICE 2,197,461

BITUMINOUS COMPOSITION

Alvin Pierce Anderson and William Kenneth Nelson, Wood River, Ill., assignors to Shell Development Company, San Francisco, Calif., a corporation of Delaware No Drawing. Application June 9, 1936, Serial No. 84,296

2 Claims. (Cl. 260—28)

This invention relates to mixtures of bituminous materials, such as asphalts, and hydrocarbon polymers of the type of polyisobutylene of molecular weights in excess of 800.

It has been suggested in the past to incorporate rubber into asphalts, and it has been found that rubberized asphalts are improved over the original asphalt, with respect to their temperature susceptibility and elasticity. While rubberized asphalts have proven to be valuable additions to existing roadbuilding and roofing materials, they have the disadvantage that they tend to break down upon heating. Asphalts containing 5% or more rubber are extremely viscous above their melting points, and in order to properly mix them with mineral aggregate, they frequently must be heated to temperatures at which the rubber decomposes to a considerable degree, whereby a good deal of the advantage gained by the addition of the rubber is destroyed. Rubber in hydrocarbon solution decomposes at an appreciable rate at temperatures as low as 200° F., the rate of decomposition rapidly increasing with increasing temperature. Moreover, rubberized asphalt has a tendency to deteriorate rather rapidly, possibly because of the instability of the rubber, which often has a detrimental effect on the lasting properties of pavements and the like made with such as asphalts.

We have discovered that asphalts which closely resemble rubberized asphalts but which are substantially stable at temperatures up to 500° F. and possess aging qualities equal to or better than those of the original asphalts can be obtained by dissolving in the bitumen a hydrocarbon polymer of the type of polyisobutylene which is colloidally dispersable in the high boiling hydrocarbons contained in asphalts, said polymer having a molecular weight in excess of about 800. Polymers particularly suited for use in our invention are those produced from olefines of the formula

in which $R_1$ is a hydrocarbon radical and $R_2$ is a hydrocarbon radical or hydrogen, said hydrocarbon radicals being aliphatic or cyclic and non-olefinic, under the influence of a polymerization catalyst of the type of boron fluoride, or their products of hydrogenation, polymerized styrene, hydrogenated polymerized styrene, polymerized indene, hydrogenated polymerized indene, hydrogenated polymerized di-olefines and hydrogenated rubber.

Polymers of the type of polyisobutylene are soluble in hydrocarbon oils, relatively small polymers being truly soluble and larger ones being colloidally dispersable. At elevated temperatures below 500° F. they are remarkably stable, either in the pure state or in solution of hydrocarbon oils. The thermal stability appears to be affected little by the size of the molecule. For instance, when solutions of various polymers having molecular weights ranging from about 1000 to 100,000 were heated to not above 500° F. for several hours, no substantial breakdown was observed in any of them. In a series of 10-hour heating tests in which 1 and 2% solutions of polymers in light lubricating oils were heated to 482° F., a maximum loss of 5% of the viscosity of the solution due to the breakdown of the polymers occurred. In most instances the loss of viscosity was below 1%.

The polymers may be directly mixed with a molten asphalt, or may be incorporated in a solution of a suitable solvent, such as naphtha, kerosene, gas oil, etc. The quantities of polymers used are usually not in excess of about 20% by weight, larger quantities tending to make the asphalt brittle. Excellent improvements in the temperature susceptibility of asphalts are obtained with 5–10% of the polymers in the asphalt.

In the table below data are presented relating to the temperature susceptibility of an asphalt to which quantities amounting to 5 and 10% of a polyisobutylene of a molecular weight of about 3000 were added. Since a low temperature susceptibility as measured by the ratios of the penetration at various temperatures is one of the most important properties of road or roofing asphalts, it may be seen that the addition of the polymers has decidedly benefited the asphalts.

| Property | Asphalt containing— | | |
|---|---|---|---|
| | No PIB | 5% PIB | 10% PIB |
| Penetration at— | | | |
| 32° F | 12 | 11 | 9.5 |
| 77° F | 27 | 31 | 30 |
| 115° F | 104 | 81 | 64 |
| Penetration at 115° F./penetration at 77° F | 3.85 | 2.61 | 2.13 |
| Penetration at 115° F./penetration at 32° F | 8.66 | 7.36 | 6.73 |
| Softening point (Ring and Ball) | 147 | 157 | 177 |
| Saybolt furol vis. at 275° F | 294 | 940 | 2520 |
| Float test at 176° F | 278 | 966 | 3189 |

We claim as our invention:

1. A road and roofing asphalt capable of being heated up to 500° F. without substantial decomposition comprising an asphalt containing not more than 20% by weight of a tertiary base olefine polymer having a molecular weight above 800.

2. A road and roofing asphalt capable of being heated up to 500° F. without substantial decomposition comprising an asphalt containing not more than 20% by weight of polyisobutylene having a molecular weight above 800.

ALVIN PIERCE ANDERSON.
WILLIAM KENNETH NELSON.